US012585716B2

(12) United States Patent
Zhang et al.

(10) Patent No.: US 12,585,716 B2
(45) Date of Patent: Mar. 24, 2026

(54) INTELLIGENT RECOMMENDATION METHOD AND APPARATUS, MODEL TRAINING METHOD AND APPARATUS, ELECTRONIC DEVICE, AND STORAGE MEDIUM

(71) Applicant: BEIJING BAIDU NETCOM SCIENCE AND TECHNOLOGY CO., LTD., Beijing (CN)

(72) Inventors: Weijia Zhang, Hefei (CN); Hao Liu, Beijing (CN); Dejing Dou, Beijing (CN); Hui Xiong, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 1123 days.

(21) Appl. No.: 17/445,905

(22) Filed: Aug. 25, 2021

(65) Prior Publication Data

US 2021/0383279 A1 Dec. 9, 2021

(30) Foreign Application Priority Data

Dec. 25, 2020 (CN) .......................... 202011561490.4

(51) Int. Cl.
| | |
|---|---|
| G06F 16/9535 | (2019.01) |
| G06F 18/20 | (2023.01) |
| G06F 18/21 | (2023.01) |
| G06F 18/2115 | (2023.01) |
| G06N 20/00 | (2019.01) |

(52) U.S. Cl.
CPC ...... G06F 16/9535 (2019.01); G06F 18/2115 (2023.01); G06F 18/2178 (2023.01); G06F 18/285 (2023.01); G06N 20/00 (2019.01)

(58) Field of Classification Search
CPC ... G06F 16/9535; G06F 18/2178–2185; G06F 18/2115; G06F 18/285; G06N 3/02–105; B60L 53/60–68; B60L 53/67
See application file for complete search history.

(56) References Cited

U.S. PATENT DOCUMENTS

| | | | | |
|---|---|---|---|---|
| 10,507,738 B1 * | 12/2019 | Hariri | ..................... | B60L 53/63 |
| 2015/0348165 A1 | 12/2015 | Kuroki et al. | | |
| 2020/0215927 A1 * | 7/2020 | Hou | ....................... | H02J 7/0045 |
| 2022/0129695 A1 * | 4/2022 | Mguni | .................. | G06F 18/285 |

FOREIGN PATENT DOCUMENTS

| | | |
|---|---|---|
| CN | 109255648 A | 1/2019 |
| CN | 111311384 A | 6/2020 |

(Continued)

OTHER PUBLICATIONS

Hariri, Abla O., et al. "A bilateral decision support platform for public charging of connected electric vehicles." IEEE Transactions on Vehicular Technology 68.1 (2018): 129-140. (Year: 2018).*

(Continued)

*Primary Examiner* — Liang Y Li
(74) *Attorney, Agent, or Firm* — Hunton Andrews Kurth LLP

(57) ABSTRACT

Provided are an intelligent recommendation method and apparatus, a model training method and apparatus, an electronic device, and a storage medium, which relate to artificial intelligence technologies, and are applicable to the intelligent recommendation and the intelligent transportation technologies. The intelligent recommendation method includes: determining an object recommendation request; determining, according to a multi-agent strategy model and the object recommendation request, object execution actions of at least two agent objects matching the object recommendation request; determining a target object execution action according to the object execution actions; and recommending the object recommendation request to a target agent object corresponding to the target object execution action.

7 Claims, 5 Drawing Sheets

(56)     References Cited

FOREIGN PATENT DOCUMENTS

| | | | |
|---|---|---|---|
| CN | 111753543 | A | 10/2020 |
| CN | 111860649 | A | 10/2020 |

OTHER PUBLICATIONS

Moghaddam, Zeinab, et al. "A coordinated dynamic pricing model for electric vehicle charging stations." IEEE Transactions on Transportation Electrification 5.1 (2019): 226-238. (Year: 2019).*

Sadeghianpourhamami, Nasrin, Johannes Deleu, and Chris Develder. "Definition and evaluation of model-free coordination of electrical vehicle charging with reinforcement learning." IEEE Transactions on Smart Grid 11.1 (2019): 203-214. (Year: 2019).*

Shin, MyungJae, Dae-Hyun Choi, and Joongheon Kim. "Cooperative management for PV/ESS-enabled electric vehicle charging stations: A multiagent deep reinforcement learning approach." IEEE Transactions on Industrial Informatics 16.5 (2019): 3493-3503. (Year: 2019).*

Wu, D. J., and Yanjun Sun. "Cooperation in multi-agent bidding." Decision Support Systems 33.3 (2002): 335-347. (Year: 2002).*

First Search Report issued in corresponding CN Application No. 2020115614904, on Nov. 10, 2023, 4 pages.

Zhou et al., Intelligent recommendation—The Application of WebGIS in New Media Content Distribution, Artificial Intelligence, Issue 2, Apr. 10, 2020, 32 pages.

* cited by examiner

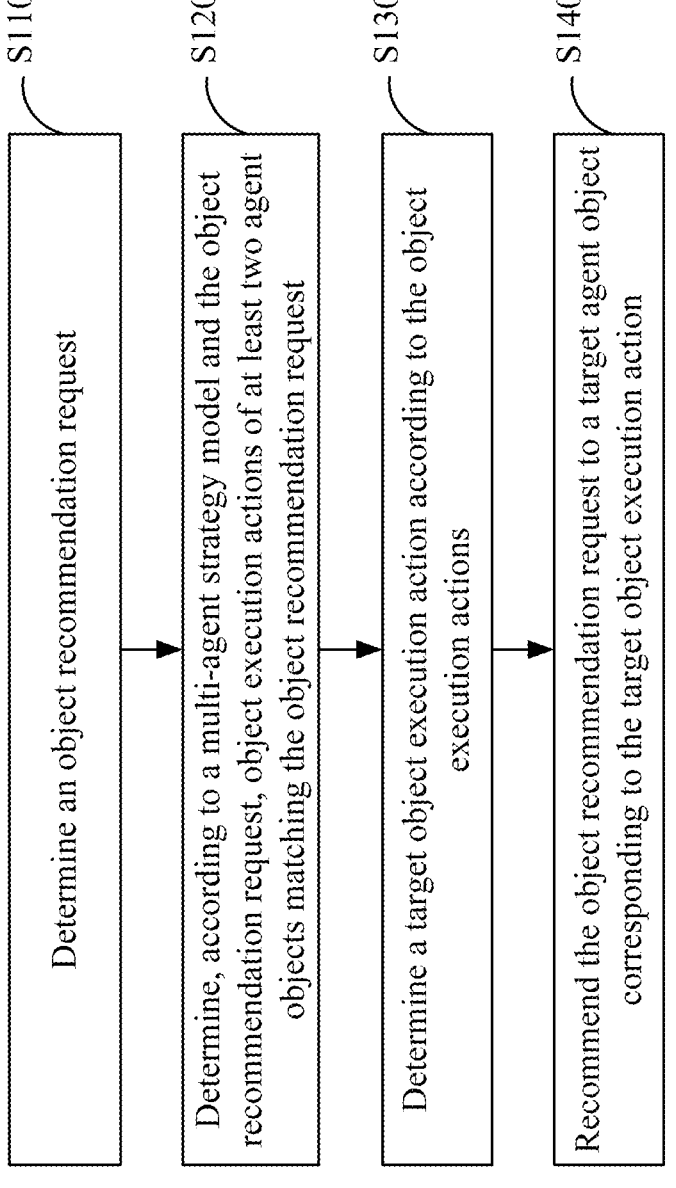

S110

Determine an object recommendation request

S120

Determine, according to a multi-agent strategy model and the object recommendation request, object execution actions of at least two agent objects matching the object recommendation request

S130

Determine a target object execution action according to the object execution actions

S140

Recommend the object recommendation request to a target agent object corresponding to the target object execution action

FIG. 1

Determine a value target function of a multi-agent strategy model and a strategy target function of the multi-agent strategy model ⟋ S310

Train, according to the value target function and the strategy target function, the multi-agent strategy model ⟋ S320

700

INTELLIGENT RECOMMENDATION METHOD AND APPARATUS, MODEL TRAINING METHOD AND APPARATUS, ELECTRONIC DEVICE, AND STORAGE MEDIUM

CROSS-REFERENCE TO RELATED APPLICATION

This application claims priority to Chinese Patent Application No. 202011561490.4 filed Dec. 25, 2020, the disclosure of which is incorporated herein by reference in its entirety.

TECHNICAL FIELD

The present application relates to the field of data processing, specifically relates to artificial intelligence technologies, and is applicable to the fields of intelligent recommendation and the intelligent transportation technologies.

BACKGROUND

Reinforcement learning shows great potential and superiority in dynamic sequence decision-making. In the reinforcement learning, agents learn a strategy by interacting with the environment to achieve long-term optimal benefits. Multi-agent reinforcement learning is an important branch in the field of multi-agent system research. The multi-agent reinforcement learning applies reinforcement learning technology and game theory to the multi-agent system, to enable multiple agents to complete more complicated tasks by means of interaction and decision-making in higher-dimensional and dynamic real scenarios, and thus can be widely applied in the fields of artificial intelligence technology such as robot systems, distributed decision-making, intelligent transportation control, and business intelligence management.

SUMMARY

Embodiments of the present application provide an intelligent recommendation method and apparatus, a model training method and apparatus, an electronic device, and a storage medium to achieve the global optimization target of object recommendation.

In a first aspect, an embodiment of the present application provides an intelligent recommendation method. The method includes the steps described below.

An object recommendation request is determined.

Object execution actions of at least two agent objects matching the object recommendation request are determined according to a multi-agent strategy model and the object recommendation request.

A target object execution action is determined according to the object execution actions.

The object recommendation request is recommended to a target agent object corresponding to the target object execution action.

In a second aspect, an embodiment of the present application provides a model training method. The method includes the steps described below.

A value target function of a multi-agent strategy model and a strategy target function of the multi-agent strategy model are determined.

The multi-agent strategy model is trained according to the value target function and the strategy target function.

The multi-agent strategy model is configured to determine, in conjunction with an object recommendation request, object execution actions of at least two agent objects matching the object recommendation request to intelligently recommend an agent object according to the object execution actions.

In a third aspect, an embodiment of the present application provides an intelligent recommendation apparatus. The apparatus includes an object recommendation request determination module, an object execution action determination module, a target object execution action determination module, and an object recommendation request recommendation module.

The object recommendation request determination module is configured to determine an object recommendation request.

The object execution action determination module is configured to determine, according to a multi-agent strategy model and the object recommendation request, object execution actions of at least two agent objects matching the object recommendation request.

The target object execution action determination module is configured to determine a target object execution action according to the object execution actions.

The object recommendation request recommendation module is configured to recommend the object recommendation request to a target agent object corresponding to the target object execution action.

In a fourth aspect, an embodiment of the present application provides a model training apparatus. The apparatus includes a function determination module and a multi-agent strategy model training module.

The function determination module is configured to determine a value target function of a multi-agent strategy model and a strategy target function of the multi-agent strategy model.

The multi-agent strategy model training module is configured to train, according to the value target function and the strategy target function, the multi-agent strategy model.

The multi-agent strategy model is configured to determine, in conjunction with an object recommendation request, object execution actions of at least two agent objects matching the object recommendation request to intelligently recommend a target agent object according to the object execution actions.

In a fifth aspect, an embodiment of the present application provides an electronic device. The electronic device includes: at least one processor; and a memory which is in a communication connection with the at least one processor.

The memory is configured to store instructions executable by the at least one processor, and the instructions are executed by the at least one processor to enable the at least one processor to perform the intelligent recommendation method provided by the embodiment in the first aspect or perform the model training method provided by the embodiment in the second aspect.

In a sixth aspect, an embodiment of the present application further provides a non-transitory computer-readable storage medium, which is configured to store a computer instruction, where the computer instruction is used for enabling a computer to perform the intelligent recommendation method provided by the embodiment in the first aspect or the model training method provided by the embodiment in the second aspect.

In a seventh aspect, an embodiment of the present application further provides a computer program product, including a computer program, where the computer program, when executed by a processor, performs the intelligent recommendation method provided by the embodiment in the first aspect or the model training method provided by the embodiment in the second aspect.

In an eighth aspect, an embodiment of the present application further provides a vehicle including a vehicle body and the electronic device provided by the embodiment in the fifth aspect.

In the embodiments of the present application, after an object recommendation request is determined, object execution actions of at least two agent objects matching the object recommendation request are determined according to a pre-trained multi-agent strategy model and the object recommendation request, then a target object execution action is determined according to the object execution actions, and the object recommendation request is recommended to a target agent object corresponding to the target object execution action, which solves the problem that the existing intelligent recommendation for multiple agent objects can only achieve local optimization, thereby achieving the global optimization target of object recommendation.

It should be understood that the content described in this part is not intended to identify key or important features of the embodiments of the present disclosure and is not intended to limit the scope of the present disclosure. Other features of the present disclosure will be easily understood from the following description.

BRIEF DESCRIPTION OF DRAWINGS

The drawings are intended to provide a better understanding of the present scheme and not to limit the present application.

FIG. 1 is a flowchart of an intelligent recommendation method according to an embodiment of the present application;

DETAILED DESCRIPTION

Figure 2:
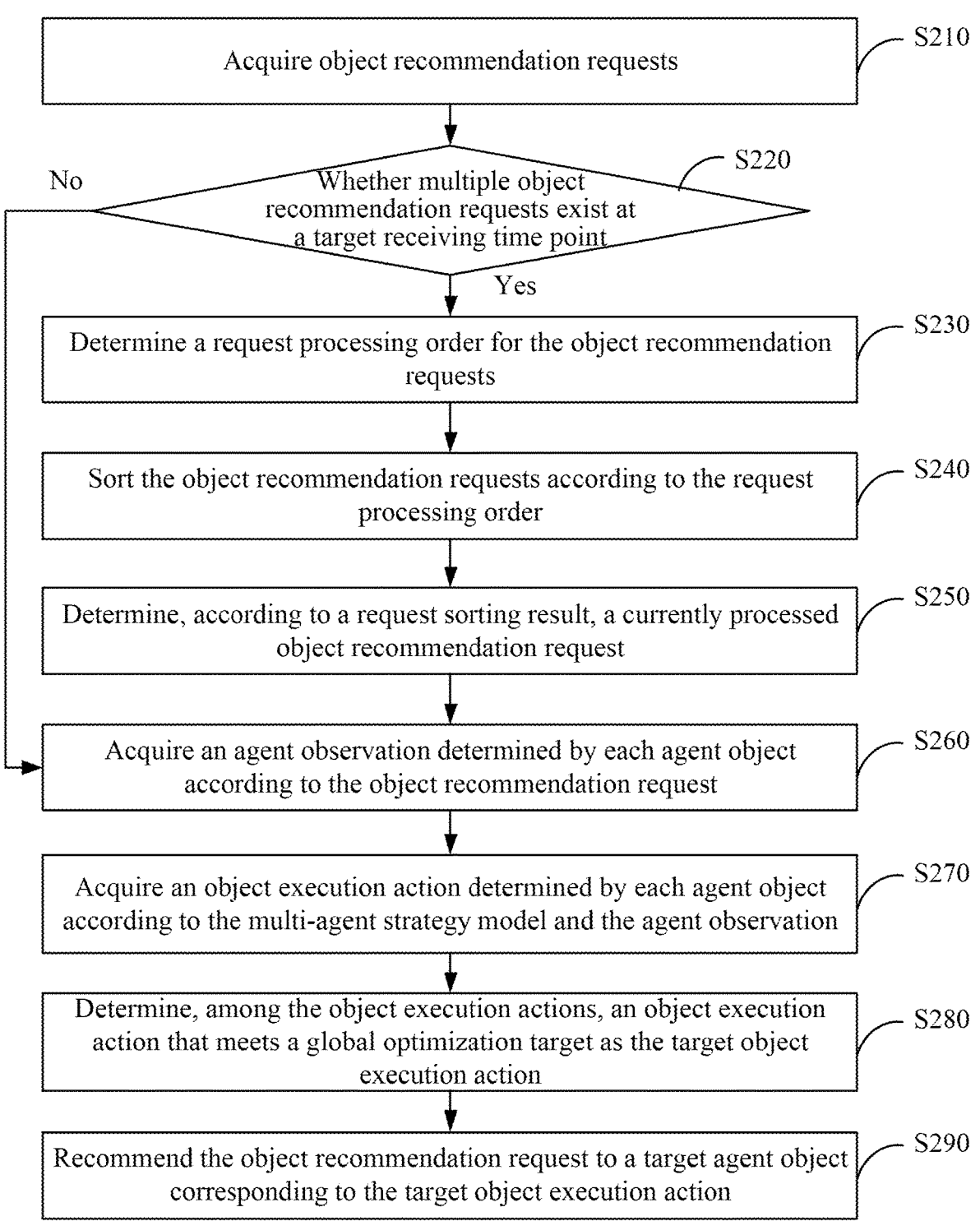
FIG. 2 is a flowchart of an intelligent recommendation method according to an embodiment of the present application.

Exemplary embodiments of the present application will be described in conjunction with the drawings, in which various details of the embodiments of the present application are included to facilitate understanding, and should be considered merely exemplary. Therefore, those of ordinary skill in the art should recognize that various variations and modifications can be made to the embodiments described herein without departing from the scope and spirit of the present application. Likewise, for the sake of clarity and conciseness, the description of well-known functions and structures is omitted below.

In one example, FIG. 1 is a flowchart of an intelligent recommendation method according to an embodiment of the present application. The embodiment of the present application can be applied to the case of performing intelligent recommendation by using a multi-agent reinforcement learning method. The method can be executed by an intelligent recommendation apparatus that can be implemented in software and/or hardware and that can generally be integrated in an electronic device. The electronic device can be a server device or other computer devices, and can also be other intelligent terminals such as a vehicle mounted terminal. Accordingly, as shown in FIG. 1, the method includes the steps described below.

In step S110, an object recommendation request is determined.

The object recommendation request may be used for requesting a device to intelligently recommend an object.

Before the intelligent recommendation is performed according to the intelligent recommendation method, the object recommendation request needs to be determined first to intelligently recommend a recommended object matching the object recommendation request.

In the embodiment of the present application, the recommended object may be of any type, and a recommended target object needs to be selected from a large number of objects by using a certain recommendation algorithm. The recommended object may be an actual object or a virtual resource. For example, the recommended object may be a charging station, a bus station, a bank outlet, or the like. Accordingly, the object recommendation request may be used for requesting recommended charging stations, bus stations, bank outlets, or the like. In an embodiment, the recommended object may have the characteristics of being a large number and requiring a certain request processing time.

In step S120, object execution actions of at least two agent objects matching the object recommendation request are determined according to a multi-agent strategy model and the object recommendation request.

The multi-agent strategy model may be a strategy model pre-trained based on a multi-agent reinforcement learning method and may be used for determining the execution actions of the agent objects. The agent objects are the recommended objects. The object execution actions are the execution actions of the agent objects.

In the embodiment of the present application, the matching recommended object is intelligently recommend to the determined object recommendation request by using a multi-agent reinforcement learning method. In an embodiment, the recommended object may be abstracted as an agent object in the multi-agent reinforcement learning method, and each agent object may be regarded as an independent agent. Assuming that charging stations are recommended objects, each agent object may represent one charging station, and the number of agent objects is the same as the number of charging stations.

Accordingly, after the object recommendation request is determined, the object execution action of each agent object matching the object recommendation request may be determined according to the multi-agent strategy model and the object recommendation request. It is to be understood that each object execution action (that is, an action) comes from the action space, and the action currently to be performed is determined according to the observation where each agent object is located and the reward of a previous observation. That is, each agent object may correspondingly determine one object execution action, and different object execution actions may achieve different expected benefits. The so-called benefit may be understood as the benefit brought by the agent object to the entire group where the agent object is located when the agent object performs the object execution action.

In step S130, a target object execution action is determined according to the object execution actions.

The target object execution action may be an object execution action that may achieve the global optimal benefit among the object execution actions.

It is to be understood that each agent object may determine multiple different object execution actions for the current object recommendation request, and each object execution action may achieve different global benefits. Therefore, after multiple object execution actions are obtained, a target object execution action that may achieve the global optimal benefit may be determined from the object execution actions.

In step S140, the object recommendation request is recommended to a target agent object corresponding to the target object execution action.

The target agent object may be an agent object for determining the target object execution action.

Accordingly, after the target object execution action is determined, the object recommendation request may be recommended to the target agent object corresponding to the target object execution action to achieve the global optimization target.

In an optional embodiment of the present application, the object recommendation request may be a charging station recommendation request, and the agent objects may be charging stations.

The charging station recommendation request is also a charging request. When a device needs to be charged, a charging request may be initiated to request an intelligent recommendation device to recommend a matching charging station for the device. The intelligent recommendation device may be a server device or other computer devices, which is not limited by the embodiments of the present application. Accordingly, after the intelligent recommendation device receives the charging request, the intelligent recommendation device may call the above-mentioned intelligent recommendation algorithm, take each available charging station as an agent object, and recommend a matching charging station for the charging request.

In an exemplary application scenario, it often takes several hours to charge an electric vehicle at a time. Due to the limited charging resources in space and the space-time imbalance of charging demands, when the charging facilities are in short supply, a long waiting time for charging will be caused, which will seriously affect the experience of electric vehicle drivers.

At present, in the schemes in the existing art, the method for recommending a charging station is mainly a method based on the greedy in which a charging station with the shortest distance or the shortest driving time is recommended for an electric vehicle. In the method based on the greedy, only the immediate benefit is often considered. However, since charging requests occurs at difference times and different locations and the adjacent recommendation decisions strongly affect each other, in the greedy algorithm, only the short-term impact of the recommendation decisions is considered and the long-term imbalance between supply and demand in space and time is ignored, which will cause the optimization of the entire charging network to be locally optimal.

In the reinforcement learning, agents learn a strategy by interacting with the environment to achieve long-term optimal benefits. If each charging station is regarded as one agent object, the continuous recommendation process of charging stations may be regarded as a multi-agent joint dynamic sequence decision-making problem. It is assumed that a charging request initiated by an electric vehicle (such as an electric automobile) through a vehicle mounted terminal is taken as an object recommendation request, and a charging station that is to charge the electric vehicle is taken as an agent object. Accordingly, after the intelligent recommendation device receives the charging request, the intelligent recommendation device may determine a corresponding object execution action for each agent object according to the environment where the each agent object is located. It is to be understood that since the distances between the electric vehicle and charging stations are different and lengths of the charging waiting time at each charging station are different, different agent objects execute their corresponding object execution actions, causing that different lengths of charging waiting time are brought to the charging request. Accordingly, the intelligent recommendation device may select the target object execution action that may achieve the global maximum benefit from the object execution actions, and send the target agent object corresponding to the target object execution action, that is, the target charging station, to the vehicle mounted terminal. The electric vehicle may be driven to the target charging station for charging according to the information of the target charging station received by the vehicle mounted terminal. The target agent object is recommend for the charging request by using the above-mentioned intelligent recommendation method, and then the global charging waiting time for all charging requests within a certain period of time can be minimized, that is, a charging station is recommended for each of charging requests from electric vehicle drivers, thereby achieving the optimization of the charging station recommendation strategy from a long-term perspective to coordinate the long-term space-time imbalance between supply and demand of charging of electric vehicles, optimizing the entire charging network from a long-term global perspective, achieving the global optimization target, and improving the efficiency of the entire charging network.

It is to be noted that the above-mentioned intelligent recommendation method may also be applied to a vehicle mounted terminal. After the vehicle mounted terminal receives a charging request, the vehicle mounted terminal may cooperate with a server to acquire resources required by the intelligent recommendation method, and then implement the intelligent recommendation method locally according to the acquired resources to recommend a charging station for the charging request.

In the embodiments of the present application, after an object recommendation request is determined, object execution actions of at least two agent objects matching the object recommendation request are determined according to a pre-trained multi-agent strategy model and the object recommendation request, then a target object execution action is determined according to the object execution actions, and the object recommendation request is recommended to a target agent object corresponding to the target object execution action, which solves the problem that the existing intelligent recommendation for multiple target objects can only achieve local optimization, thereby achieving the global optimization target of object recommendation.

In one example, FIG. 2 is a flowchart of an intelligent recommendation method according to an embodiment of the present application. On the basis of the technical schemes of the above-mentioned embodiments, the embodiment of the present application is optimized and improved and provides multiple specific optional implementations of determining an object recommendation request, determining an object execution action, and determining a target object execution action.

The intelligent recommendation method as shown in FIG. 2 includes the steps described below.

In step S210, object recommendation requests are acquired.

Before the object recommendation request is determined, the object recommendation requests can be acquired first. In the embodiment of the present application, intelligent recommendation processing may be performed on each object recommendation request in turn. It is to be understood that in practical application, multiple different object recommendation requests may be generated at the same time point with a certain time unit as the reference. Therefore, for multiple different object recommendation requests generated at the same time point, the processing order of the object recommendation requests needs to be determined.

In step S220, whether there are multiple object recommendation requests at a target receiving time point is determined. If there are multiple object recommendation requests at the target receiving time point, perform step S230, otherwise, perform step S260.

In step S230, a request processing order is determined for the object recommendation requests.

In step S240, the object recommendation requests are sorted according to the request processing order.

In step S250, a currently processed object recommendation request is determined according to a request sorting result.

The receiving time point may be the receiving time of each of the object recommendation requests. The target receiving time point may be the receiving time at which two or more object recommendation requests are simultaneously received. It is to be understood that when the reference time unit of the receiving time points is different, the receiving situation of the object recommendation requests is also different. For example, assuming that the receiving time point is in seconds, when the receiving time of two object recommendation requests is 00:00.07 and 00:00.10, respectively, it may be considered that both object recommendation requests are received at the same target receiving time point 00:00. Assuming that the receiving time point is in milliseconds, when the receiving time of two object recommendation requests is 00:00.07 and 00:00.10, respectively, it may be considered that the two object recommendation requests are received at different receiving time points. The request processing order may be a processing order corresponding to object recommendation requests generated within the same time point.

When multiple different object recommendation requests are generated at the target receiving time point, a request processing order may be determined for each of the object recommendation requests, respectively, to sort the object recommendation requests according to the determined request processing orders, thereby determining the currently processed object recommendation request according to the final request sorting result.

In an embodiment, the request processing order may be determined according to the refined receiving time of each of the object recommendation requests. For example, assuming that the receiving time of two object recommendation requests is in seconds, for example, the target receiving time of the two object recommendation requests is 00:00, the target receiving time may be further refined to time in milliseconds to determine the request processing order according to the generation time refined to milliseconds of each of the object recommendation requests. For example, the refined receiving time of object recommendation request 1 is 00:00.07, the refined receiving time of object recommendation request 2 is 00:00.10, and then the above-mentioned receiving time is the actual receiving time of the two object recommendation requests, respectively. It thus may be determined that the request processing order of the object recommendation request 1 and the object recommendation request 2 is: object recommendation request 1-object recommendation request 2. That is, the object recommendation request 1 is used as the currently processed object recommendation request for intelligent recommendation, and then the object recommendation request 2 is used as the currently processed object recommendation request for intelligent recommendation.

In an embodiment, if it is still difficult to determine the request processing order according to the refined receiving time of each of the object recommendation requests, the request processing order may be directly determined by randomly sorting the object recommendation requests. For example, if the receiving time refined to milliseconds or even microseconds of the object recommendation request 1 and the object recommendation request 2 is still the same, at this point, the object recommendation request 1 and the object recommendation request 2 may be randomly sorted. For example, the request processing order of the object recommendation request 1 and the object recommendation request 2 may be determined as: object recommendation request 2-object recommendation request 1.

In the above-mentioned technical scheme, the request processing order is determined through multiple object recommendation requests acquired at the target receiving time so as to determine the currently processed object recommendation request, thereby achieving the sequential processing process of the object recommendation requests.

In step S260, an agent observation determined by each agent object is acquired according to the object recommendation request.

The agent observation may be used for each agent object to determine a corresponding object execution action of the each agent object.

After the object recommendation request is determined, the agent observation determined by each agent object according to the object recommendation request and the current environment may be further acquired to infer a local state of the current environment according to the agent observation and determine an object execution action in a next step according to the inferred state.

In step S270, an object execution action determined by each agent object according to the multi-agent strategy model and the agent observation is acquired.

The agent object may further determine an object execution action in a next step for the determined agent observation by using the multi-agent strategy model. Since the agent observation may acquire local state information of the environment in which the agent objects are currently located, the complex interaction between the agent objects may be comprehensively considered by determining the object execution actions of the agent objects according to the agent observation and the multi-agent strategy model, thereby achieving the mutual cooperation of the agent objects.

In an optional embodiment of the present application, the step in which the object execution action determined by each agent object according to the multi-agent strategy model and the agent observation is acquired may include that: the object execution action determined by each agent object according to the multi-agent strategy model and the agent observation is acquired based on the following equation:

$$a_t^i = \pi_{\theta^a}(0_t^i).$$

In the above-mentioned equation, $a_t^i$ denotes the object execution action, $\pi_{\theta^a}$ denotes the multi-agent strategy model, $\theta^a$ denotes a model parameter of the multi-agent strategy model, and $o_t^i$ denotes the agent observation.

In step S280, an object execution action that meets a global optimization target among the object execution actions is determined as the target object execution action.

The object execution action that meets the global optimization target may be an object execution action that has the largest action value among the object execution actions.

In the embodiment of the present application, after the object execution action corresponding to each agent object is obtained, an object execution action that has the largest action value may be selected as the target object execution action from the object execution actions. That is, the largest $a_t^i$ is selected as the target object execution action. $a_t^i$ being the largest means that the object recommendation request matches the target agent object best, and at this point, the global benefit brought by the object recommendation scheme is the greatest.

In step S290, the object recommendation request is recommended to a target agent object corresponding to the target object execution action.

In the above-mentioned scheme, after a currently processed object recommendation request is determined, an agent observation determined by each agent object according to the object recommendation request is acquired, an object execution action determined by each agent object according to the multi-agent strategy model and the agent observation is acquired, a target execution action is selected from the object execution actions, and the object recommendation request is recommended to a target agent object corresponding to the target object execution action, thereby achieving the global optimization target of object recommendation.

Figure 3:
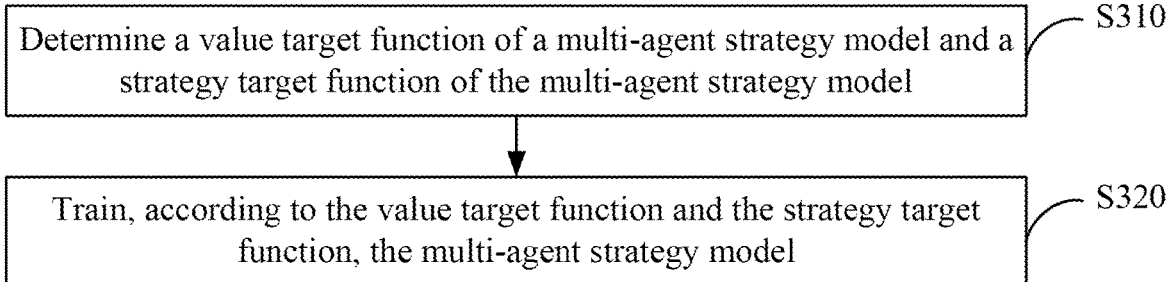
FIG. 3 is a flowchart of a model training method according to an embodiment of the present application.

In one example, FIG. 3 is a flowchart of a model training method according to an embodiment of the present application. The embodiment of the present application may be applied to the case of training a multi-agent strategy model. The method may be executed by a model training apparatus that can be implemented in software and/or hardware and that can generally be integrated in an electronic device. The electronic device may be a computer device or a server device. Accordingly, as shown in FIG. 3, the method includes the steps described below.

In step S310, a value target function of a multi-agent strategy model and a strategy target function of the multi-agent strategy model are determined.

In the embodiment of the present application, the multi-agent strategy model mainly includes two kinds of targets, that is, a strategy target and a value target. Therefore, when the multi-agent strategy model is trained, the value target function and the strategy target function of the multi-agent strategy model need to be determined first.

In an optional embodiment of the present application, the step in which the strategy target function of the multi-agent strategy model is determined may include that: the strategy target function of the multi-agent strategy model is determined based on the following equations:

$$L_A(\theta^a) = -E_{t'}\left[\min\left(\rho_{t'}^i \hat{A}_{t'}^i, \text{clip}(\rho_{t'}^i, 1-\epsilon, 1+\epsilon)\hat{A}_{t'}^i\right)\right]$$

$$p_{t'}^i = \frac{\pi_{\theta^a}(a_{t'}^i \mid o_{t'}^i)}{\pi_{\theta_{t'}^a}(a_{t'}^i \mid o_{t'}^i)}$$

$$\hat{A}_{t'}^i = R_{t':t} + Y^{(T_t - T_{t'})} V_{\theta_{t'}^c}(o_t^i) - V_{\theta_{t'}^c}(o_{t'}^i)$$

$$R_{t:t+j} = \sum_{T_t < T_{t'}^c \le T_{t+j}} \gamma^{(T_{t'}^c - T_t - 1)} r(s_{t'}, u_{t'}).$$

In the above-mentioned equations, $L_A(\theta^a)$ denotes the strategy target function, $\theta^a$ denotes a network parameter of a strategy target neural network, t and t' denote numbers of object recommendation requests, $\mathbb{E}_{t'}$ denotes an expectation, $\rho_{t'}^i$ denotes a probability ratio, $\hat{A}_{t'}^i$ denotes an advantage function, clip ( ) denotes a clipping function, E denotes a numerical value in an interval [0, 1], i and j denote natural numbers, $R_{t':t}$ and $R_{t:t+j}$ denote accumulated discounted rewards, respectively, $\gamma$ denotes a discount factor, $T_t$ and $T_{t'}$ denote initiation times of the object recommendation requests, $T_{t'}^c$ denotes a completion time of a t'-th object recommendation request, $r(s_{t'}, u_{t'})$ denotes a reward corresponding to the t'-th object recommendation request, se denotes a state of each of all the agent objects in a t'-th step, and $u_{t'}$ denotes a joint action of all agent objects in the t'-th step.

The strategy target neural network may be a neural network used for training the multi-agent strategy model. In the actual training process, the above-mentioned strategy target function may be used as a loss function of the strategy target neural network, to learn the multi-agent strategy model $\pi_{\theta^a}$ in the strategy target function in a manner of training the strategy target neural network. Since the strategy target function includes an unknown value target function, the value target function needs to be acquired before the strategy target neural network is trained.

In an optional embodiment of the present application, the step in which the value target function of the multi-agent strategy model is determined may include that: the value target function of the multi-agent strategy model is determined based on the following equation:

$$L_C(\theta^c) = \mathbb{E}_{t'}\left[\left(R_{t':t} + \gamma^{(T_t - T_{t'})} V_{\theta_{t'}^c}(o_t^i) - V_{\theta^c}(o_{t'}^i)\right)^2\right].$$

In the above-mentioned equation, $L_C(\theta^c)$ denotes a mean square error (MSE) loss function of a value target neural network, $\theta^c$ is a model parameter of the value target neural network, and $V_{\theta_{t'}^c}$ and $V_{\theta^c}$ denote the value target function.

The value target neural network may be a neural network used for training the value target function. Before the strategy target neural network is trained, the above-mentioned MSE function may be used as a loss function of the value target neural network, and the value target function may be learned in a manner of training the target neural network. After the value target neural network is success-fully trained, the model parameter $\theta^c$ of the value target neural network is fixed, that is, the MSE loss function is determined. At this point, the value target function is also determined. It is to be noted that in order to maintain the scalability of the intelligent recommendation method, all agent objects may share the network parameters of the same group of strategy target neural network and value target neural network.

Accordingly, after the above-mentioned value target func-tion is acquired, the value target function may be substituted into the strategy target function.

In step S320, the multi-agent strategy model is trained according to the value target function and the strategy target function.

The multi-agent strategy model is configured to deter-mine, in conjunction with an object recommendation request, object execution actions of at least two agent objects matching the object recommendation request to intelligently recommend a target agent object according to the object execution actions.

In one specific example, a charging request for requesting to recommend a charging station is taken as an object recommendation request, and a charging request $q_t$ is defined as a t-th request (also called a t-th step) in a day. One charging request $q_t$ may include the following attributes: a location $l_t$ where $q_t$ is issued, the time $T_t$ when $q_t$ is issued, and the time $T_t^c$ when $q_t$ is completed. In this example, a request being completed means that the charging succeeds for the request or the charging fails. Accordingly, the charg-ing waiting time (referred to as CWT hereinafter) may be defined as the sum of the travel time from the location $l_t$ where the charging request $q_t$ is issued to the location of the target charging station and the time for waiting in line for charging at the target charging station. Accordingly, the charging station recommendation problem may be abstracted as: considering the charging request set Q of a day, the global optimization target is to intelligently recom-mend a charging station for each charging request $q_t \in Q$ in a day, so as to minimize the total CWT of all charging requests Q in a day.

Accordingly, charging stations that may provide charging services are taken as agents. Each charging station $c_i \in C$ is regarded as one independent agent object, where C is a set of all charging stations. For one charging request $q_t$, the observation $o_t^i$ of the agent $c_i$ may be defined as: a) current time, b) the number of currently idle charging spots of the charging station $c_i$, c) the number of charging requests near the charging station $c_i$ in the next 15 minutes, d) estimated travel time from the location of the current charging request to the charging station $c_i$, and e) charging power of the charging station $c_i$. When the number of charging requests near the charging station $c_i$ in the next 15 minutes is determined, the number of charging requests in the future may be predicted by using a trained prediction model. In addition, $s_t = \{o_t^1, o_t^2, \ldots, o_t^N\}$ may also be defined to represent the state of each of all agent objects in the t-th step.

Figure 4:
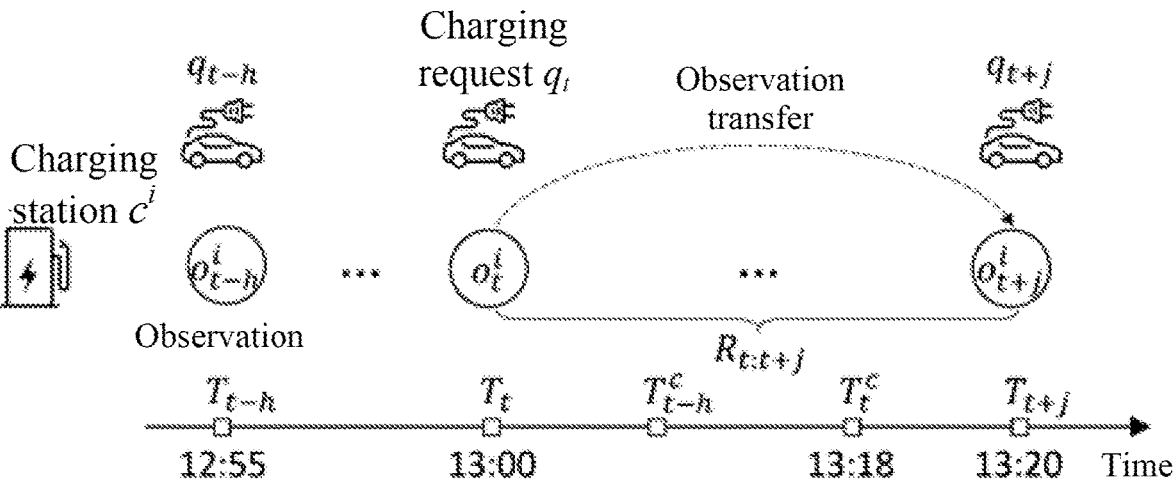
FIG. 4 is a schematic diagram of an example of observation transfer according to an embodiment of the present application.

Accordingly, when the current observation $o_t^i$ is given, each agent object $c^i$ executes an object execution action $a_t^i$ at the same time, and $q_t$ is recommended to the charging station with the largest action value $a_t^i$. The joint action of all agent objects is defined as $u_t = \{a_t^1, a_t^2, \ldots, a_t^N\}$. The observation transfer is defined as the transfer from the current charging request $q_t$ to the next request $q_{t+j}$ after the current charging request $q_t$ is completed. FIG. 4 is a sche-matic diagram of an example of observation transfer accord-ing to an embodiment of the present application. As shown in FIG. 4, when a charging request $q_t$ occurs at time $T_t$ (13:00), at this point, each agent object $c^i$ executes an object execution action $a_t^i$ based on the observation $o_t^i$ of the each agent object $c^i$ and then an agent object with the largest action value is selected as the recommended charging sta-tion. After the charging request completion time $T_t^c$ (13:18), the next charging request $q_{t+j}$ occurs at time $T_{t+j}$ (13:20). In this example, the observation transfer of the agent object $c^i$ is defined as $(o_t^i, a_t^i, o_{t+j}^i)$, where $o_{t+j}^i$ is the observation of $c^i$ corresponding to $q_{t+j}$.

Meanwhile, the present application further provides a reward mechanism of delay. The mechanism is as follows: when the charging succeeds for a charging request $q_t$, the environment returns a negative CWT as a reward for each agent object due to this joint recommendation. If the CWT of $q_t$ exceeds 45 minutes, it is considered that the charging fails for $q_t$. Then the environment returns a smaller reward value (for example, −60) as the punishment for each agent object due to this recommendation. However, there are multiple lagging rewards (for example, $T_t^c$ and $T_{t-h}^c$ in FIG. 4) from observation $o_t^i$ to observation $o_{t+j}^i$, and thus the accumulated discounted rewards may be calculated. The rewards of all completed charging requests between $T_t$ and $T_{t+j}$ are multiplied by the discount factor and then are summed up, and the equation of the accumulated discounted rewards is expressed as:

$$R_{t:t+i} = \sum_{T_t < T_{t'}^c \leq T_{t+j}} \gamma^{(T_{t'}^c - T_t - 1)} r(s_{t'}, u_t').$$

Accordingly, for the charging station intelligent recom-mendation problem, the value target function and the strat-egy target function may be further determined by using the above-mentioned parameter definitions, so as to train the multi-agent strategy model $\pi_{\theta^a}$ according to the value target function and the strategy target function. When the multi-agent strategy model $\pi_{\theta^a}$ is successfully trained, the object execution action of each agent object may be determined according to $a_t^i = \pi_{\theta^a}(o_t^i)$, thereby determining the target object execution action according to the object execution actions to recommend the object recommendation request to the target agent object corresponding to the target object execution action.

In the embodiments of the present application, the multi-agent strategy model is trained according to the determined value target function and strategy target function, after an object recommendation request is determined, object execu-tion actions of at least two agent objects matching the object recommendation request are determined according to the multi-agent strategy model and the object recommendation request, then a target object execution action is determined according to the object execution actions, and the object recommendation request is recommended to a target agent object corresponding to the target object execution action, which solves the problem that the existing intelligent rec-ommendation for multiple agent objects can only achieve local optimization, thereby achieving the global optimiza-tion target of object recommendation.

Figure 5:
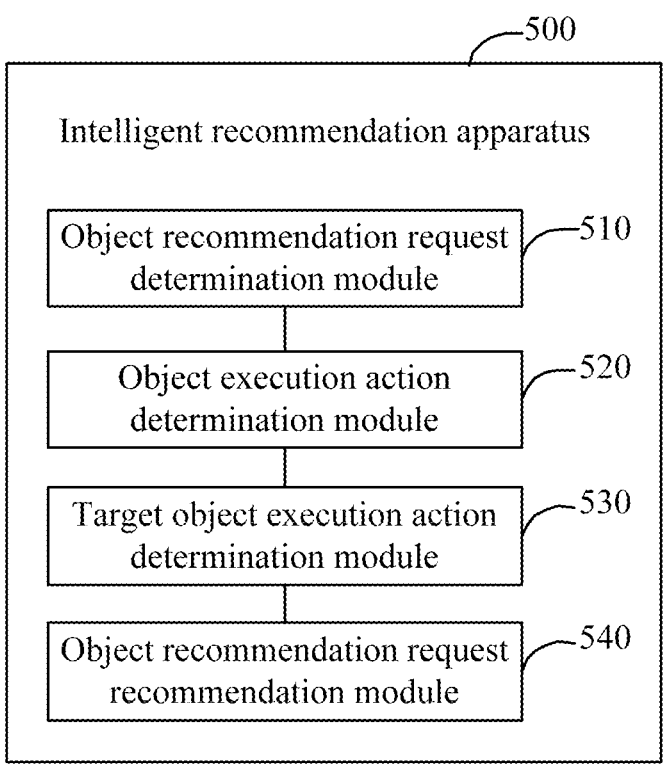
FIG. 5 is a structural diagram of an intelligent recommendation apparatus according to an embodiment of the present application.

In one example, FIG. 5 is a structural diagram of an intelligent recommendation apparatus according to an embodiment of the present application. The embodiment of the present application may be applied to the case of performing intelligent recommendation by using a multi-agent reinforcement learning method. The apparatus may be implemented in software and/or hardware and may be configured in an electronic device. The electronic device may be a server device or other computer devices, and may also be other intelligent terminals such as a vehicle mounted terminal.

The intelligent recommendation apparatus 500 as shown in FIG. 5 includes an object recommendation request determination module 510, an object execution action determination module 520, a target object execution action determination module 530, and an object recommendation request recommendation module 540.

The object recommendation request determination module 510 is configured to determine an object recommendation request.

The object execution action determination module 520 is configured to determine, according to a multi-agent strategy model and the object recommendation request, object execution actions of at least two agent objects matching the object recommendation request.

The target object execution action determination module 530 is configured to determine a target object execution action according to the object execution actions.

The object recommendation request recommendation module 540 is configured to recommend the object recommendation request to a target agent object corresponding to the target object execution action.

In the embodiments of the present application, after an object recommendation request is determined, object execution actions of at least two agent objects matching the object recommendation request are determined according to a pre-trained multi-agent strategy model and the object recommendation request, then a target object execution action is determined according to the object execution actions, and the object recommendation request is recommended to a target agent object corresponding to the target object execution action, which solves the problem that the existing intelligent recommendation for multiple target objects can only achieve local optimization, thereby achieving the global optimization target of object recommendation.

In an embodiment, the object recommendation request determination module 510 is configured to acquire object recommendation requests; in a case of determining that multiple object recommendation requests exist at a target receiving time point, determine a request processing order for the object recommendation requests; sort the object recommendation requests according to the request processing order; and determine, according to a request sorting result, a currently processed object recommendation request.

In an embodiment, the object execution action determination module 520 is configured to acquire an agent observation determined by each agent object according to the object recommendation request; and acquire an object execution action determined by each agent object according to the multi-agent strategy model and the agent observation.

In an embodiment, the object execution action determination module 520 is configured to acquire, based on the following equation, the object execution action determined by each agent object according to the multi-agent strategy model and the agent observation:

$$a_t^i = \pi_{\theta^a}(o_t^i).$$

In the above-mention equation, $a_t^i$ denotes the object execution action, $\pi_{\theta^a}$ denotes the multi-agent strategy model, $\theta^a$ denotes a model parameter of the multi-agent strategy model, and $o_t^i$ denotes the agent observation.

In an embodiment, the target object execution action determination module 530 is configured to determine, among the object execution actions, an object execution action that meets a global optimization target as the target object execution action.

In an embodiment, the object recommendation request is a charging station recommendation request, and the agent objects are charging stations.

The above-mentioned intelligent recommendation apparatus may execute the intelligent recommendation method provided by any one of the embodiments of the present application, and has functional modules and beneficial effects corresponding to the execution method. For technical details not described in detail in the embodiments, reference may be made to the intelligent recommendation method provided by any one of the embodiments of the present application.

Since the above-mentioned intelligent recommendation apparatus is an apparatus that may execute the intelligent recommendation method in the embodiments of the present application, based on the intelligent recommendation method described in the embodiments of the present application, those skilled in the art can understand the specific implementation of the intelligent recommendation apparatus of the embodiment and various variations thereof, and thus the process in which the intelligent recommendation apparatus implements the intelligent recommendation method in the embodiments of the present application will not be described in detail here. Any apparatus adopted by those skilled in the art to implement the intelligent recommendation method in the embodiments of the present application is within the scope of the present application.

Figure 6:
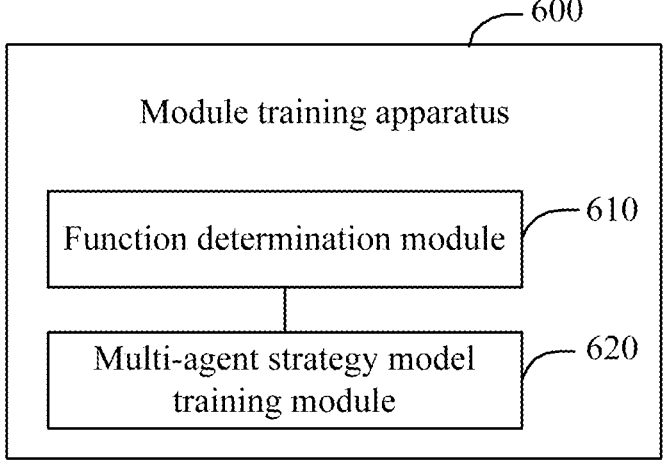
FIG. 6 is a structural diagram of a model training apparatus according to an embodiment of the present application.

In one example, FIG. 6 is a structural diagram of a model training apparatus according to an embodiment of the present application. The embodiment of the present application may be applied to the case of training a multi-agent strategy model. The apparatus may be implemented in software and/or hardware and may be configured in an electronic device. The electronic device may be a server device or other computer devices.

The module training apparatus 600 as shown in FIG. 6 includes a function determination module 610 and a multi-agent strategy model training module 620.

The function determination module 610 is configured to determine a value target function of a multi-agent strategy model and a strategy target function of the multi-agent strategy model.

The multi-agent strategy model training module 620 is configured to train, according to the value target function and the strategy target function, the multi-agent strategy model.

The multi-agent strategy model is configured to determine, in conjunction with an object recommendation request, object execution actions of at least two agent objects matching the object recommendation request to intelligently recommend a target agent object according to the object execution actions.

In the embodiments of the present application, the multi-agent strategy model is trained according to the determined value target function and strategy target function, after an object recommendation request is determined, object execution actions of at least two agent objects matching the object recommendation request are determined according to the multi-agent strategy model and the object recommendation request, then a target object execution action is determined according to the object execution actions, and the object recommendation request is recommended to a target agent object corresponding to the target object execution action, which solves the problem that the existing intelligent recommendation for multiple target objects can only achieve local optimization, thereby achieving the global optimization target of object recommendation.

In an embodiment, the function determination module 610 is configured to determine the strategy target function of the multi-agent strategy model based on the following equations:

$$L_A(\theta^a) = -E_{t'}\left[\min(\rho_{t'}^i \hat{A}_{t'}^i, \text{clip}(\rho_{t'}^i, 1-\epsilon, 1+\epsilon)\hat{A}_{t'}^i)\right]$$

$$\rho_{t'}^i = \frac{\pi_{\theta^a}(a_{t'}^i \mid o_{t'}^i)}{\pi_{\theta_a^a}(a_{t'}^i \mid o_{t'}^i)}$$

$$\hat{A}_{t'}^i = R_{t':t} + \gamma^{(T_t - T_{t'})} V_{\theta_{t'}^c}(o_t^i) - V_{\theta_{t'}^c}(o_{t'}^i)$$

$$R_{t:t+j} = \sum_{T_t < T_{t'}^C \leq T_{t+j}} \gamma^{(T_{t'}^C - T_t - 1)} r(s_{t'}, u_{t'})$$

In the above-mentioned equations, $L_A(\theta^a)$ denotes the strategy target function, $\theta^a$ denotes a network parameter of a strategy target neural network, t and t' denote numbers of object recommendation requests, $\mathbb{E}_{t'}$ denotes an expectation, $\rho_{t'}^i$ denotes a probability ratio, $\hat{A}_{t'}^i$ denotes an advantage function, clip ( ) denotes a clipping function, $\epsilon$ denotes a numerical value in an interval [0, 1], i and j denote natural numbers, $R_{t':t}$ and $R_{t:t+j}$ denote accumulated discounted rewards, respectively, $\gamma$ denotes a discount factor, $T_t$ and $T_{t'}$ denote initiation times of the object recommendation requests, $T_{t'}^c$ denotes a completion time of a t'-th object recommendation request, r( ) denotes a reward corresponding to the t'-th object recommendation request, $s_{t'}$ denotes a state of each of all the agent objects in a t'-th step, and $u_{t'}$ denotes a joint action of all agent objects in the t'-th step.

In an embodiment, the function determination module 610 is configured to determine the value target function of the multi-agent strategy model based on the following equation:

$$L_C(\theta^c) = \mathbb{E}_{t'}\left[\left(R_{t':t} + \gamma^{(T_t - T_{t'})} V_{\theta_{t'}^c}(o_t^i) - V_{\theta^c}(o_{t'}^i)\right)^2\right].$$

In the above-mentioned equation, $L_c(\theta^c)$ denotes an MSE loss function of a value target neural network, $\theta^c$ is a model parameter of the value target neural network, and $V_{\theta_{t'}^c}$ and $V_{\theta^c}$ denote the value target function.

In one example, the present application further provides an electronic device, a computer-readable storage medium, and a computer program product.

Figure 7:
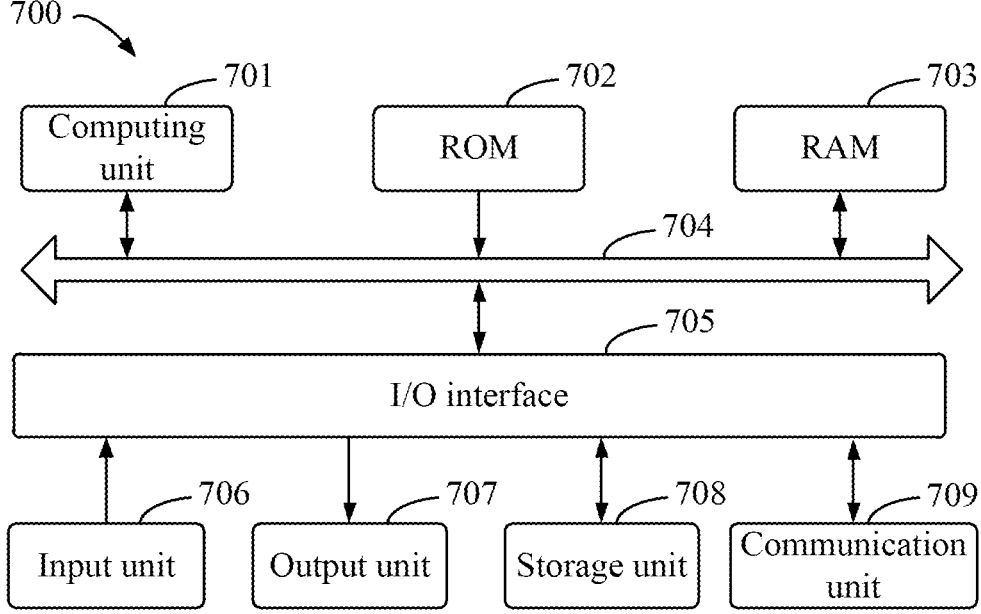
FIG. 7 is a schematic block diagram of an exemplary electronic device 700 for implementing the embodiments of the present disclosure.

FIG. 7 is a schematic block diagram of an exemplary electronic device 700 for implementing the embodiments of the present disclosure. The electronic device is intended to represent various forms of digital computer, for example, a laptop computer, a desktop computer, a worktable, a personal digital assistant, a server, a blade server, a mainframe computer or another applicable computer. The electronic device may also represent various forms of mobile device, for example, a personal digital assistant, a cellphone, a smartphone, a wearable device or another similar computing device. Herein the shown components, the connections and relationships between these components, and the functions of these components are illustrative only and are not intended to limit the implementation of the present disclosure as described and/or claimed herein.

As shown in FIG. 7, the device 700 includes a computing unit 701. The computing unit 701 can execute various types of appropriate actions and processing according to a computer program stored in a read-only memory (ROM) 702 or a computer program loaded from a storage unit 708 to a random-access memory (RAM) 703. Various programs and data required for operations of the device 700 may also be stored in the RAM 703. The computing unit 701, the ROM 702, and the RAM 703 are connected to each other through a bus 704. An input/output (I/O) interface 705 is also connected to the bus 704.

Multiple components in the device 700 are connected to the I/O interface 705. The multiple components include an input unit 706 such as a keyboard and a mouse, an output unit 707 such as various types of displays and speakers, the storage unit 708 such as a magnetic disk and an optical disk, and a communication unit 709 such as a network card, a modem, and a wireless communication transceiver. The communication unit 709 allows the device 700 to exchange information/data with other devices over a computer network, such as the Internet, and/or various telecommunication networks.

The computing unit 701 may be various general-purpose and/or special-purpose processing components having processing and computing capabilities. Some examples of the computing unit 701 include, but are not limited to, central processing units (CPUs), graphics processing units (GPUs), various special-purpose artificial intelligence (AI) computing chips, various computing units running machine learning models and algorithms, digital signal processors (DSPs), and any suitable processors, controllers and microcontrollers. The computing unit 701 executes various methods and processing described above, such as the intelligent recommendation method or the model training method. For example, in some embodiments, the intelligent recommendation method or the model training method may be implemented as a computer software program tangibly contained in a machine-readable medium such as the storage unit 708. In some embodiments, part or all of a computer program may be loaded and/or installed on the device 700 via the ROM 702 and/or the communication unit 709. When the computer program is loaded on the RAM 703 and executed by the computing unit 701, one or more steps of the intelligent recommendation method or the model training method may be executed. Alternatively, in other embodiments, the computing unit 701 may be configured, in any other suitable manner (for example, by means of firmware), to execute the intelligent recommendation method or the model training method.

Herein various implementations of the systems and techniques described above may be implemented in digital electronic circuitry, integrated circuitry, field-programmable gate arrays (FPGAs), application-specific integrated circuits (ASICs), application-specific standard products (ASSPs), systems on a chip (SoCs), complex programmable logic devices (CPLDs), computer hardware, firmware, software, and/or combinations thereof. The various implementations may include implementations in one or more computer programs. The one or more computer programs are executable, interpretable, or executable and interpretable on a programmable system including at least one programmable processor. The programmable processor may be a dedicated or general-purpose programmable processor which can receive data and instructions from a memory system, at least one input device and at least one output device and transmit the data and instructions to the memory system, the at least one input device and the at least one output device.

Program codes for implementing the methods of the present disclosure may be written in any combination of one or more programming languages. These program codes may be provided for a processor or controller of a general-purpose computer, a dedicated computer or another programmable data processing device such that the program codes, when executed by the processor or controller, cause functions/operations specified in the flowcharts and/or block diagrams to be implemented. The program codes may be executed in whole on a machine, executed in part on a machine, executed, as a stand-alone software package, in part on a machine and in part on a remote machine, or executed in whole on a remote machine or a server.

In the context of the present disclosure, the machine-readable medium may be a tangible medium that may include or store a program that is used by or used in conjunction with a system, apparatus or device that executes instructions. The machine-readable medium may be a machine-readable signal medium or a machine-readable storage medium. The machine-readable medium may include, but is not limited to, electronic, magnetic, optical, electromagnetic, infrared or semiconductor systems, apparatuses or devices or any suitable combinations thereof. More specific examples of the machine-readable storage medium may include an electrical connection based on one or more wires, a portable computer disk, a hard disk, an RAM, an ROM, an erasable programmable read-only memory (EPROM), a flash memory, an optical fiber, a portable compact disk read-only memory (CD-ROM), an optical memory device, a magnetic memory device or any suitable combination thereof.

In order to provide the interaction with a user, the systems and techniques described herein may be implemented on a computer. The computer has a display device (for example, a cathode-ray tube (CRT) or a liquid-crystal display (LCD) monitor) for displaying information to the user, and a keyboard and a pointing device (for example, a mouse or a trackball) through which the user can provide input to the computer. Other types of devices may also be used for providing the interaction with the user. For example, feedback provided for the user may be sensory feedback in any form (for example, visual feedback, auditory feedback or haptic feedback). Moreover, input from the user may be received in any form (including acoustic input, voice input or haptic input).

The systems and techniques described herein may be implemented in a computing system (for example, a data server) including a back-end component, a computing system (for example, an application server) including a middleware component, a computing system (for example, a user computer having a graphical user interface or a web browser through which a user can interact with implementations of the systems and techniques described herein) including a front-end component or a computing system including any combination of such back-end, middleware or front-end components. Components of a system may be interconnected by any form or medium of digital data communication (for example, a communication network). Examples of the communication network include a local area network (LAN), a wide area network (WAN), a blockchain network and the Internet.

The computing system may include clients and servers. A client and a server are generally remote from each other and typically interact through a communication network. The relationship between the client and the server arises by virtue of computer programs running on respective computers and having a client-server relationship to each other. The server may be a cloud server, also referred to as a cloud computing server or a cloud host. As a host product in a cloud computing service system, the server solves the defects of difficult management and weak service scalability in a traditional physical host and a traditional virtual private server (VPS) service.

In the embodiments of the present application, after an object recommendation request is determined, object execution actions of at least two agent objects matching the object recommendation request are determined according to a pre-trained multi-agent strategy model and the object recommendation request, then a target object execution action is determined according to the object execution actions, and the object recommendation request is recommended to a target agent object corresponding to the target object execution action, which solves the problem that the existing intelligent recommendation for multiple agent objects can only achieve local optimization, thereby achieving the global optimization target of object recommendation.

On the basis of the above-mentioned embodiments, an embodiment of the present application further provides a vehicle. The vehicle includes a vehicle body and the electronic device described in the embodiments of the present application.

It is to be understood that various forms of the preceding flows may be used, with steps reordered, added or removed. For example, the steps described in the present disclosure may be executed in parallel, in sequence or in a different order as long as the desired result of the technical scheme disclosed in the present disclosure is achieved. The execution sequence of these steps is not limited herein.

The scope of the present disclosure is not limited to the preceding implementations. It is to be understood by those skilled in the art that various modifications, combinations, subcombinations and substitutions may be made depending on design requirements and other factors. Any modifications, equivalent substitutions, improvements and the like made within the spirit and principle of the present disclosure are within the scope of the present disclosure.

What is claimed is:

1. An intelligent recommendation method, executed by an electronic device and comprising:

determining an object recommendation request, wherein the object recommendation request is a charging station recommendation request;

determining, according to a multi-agent strategy model and the object recommendation request, object execution actions of at least two agent objects matching the object recommendation request, wherein the at least two agent objects are charging stations;

determining a target object execution action according to the object execution actions; and recommending the object recommendation request to a target agent object corresponding to the target object execution action;

wherein the multi-agent strategy model is trained according to a value target function of the multi-agent strategy model and a strategy target function of the multi-agent strategy model;

wherein the strategy target function of the multi-agent strategy model is determined based on the following equations:

$$L_A(\theta^a) = -E_{t'}\left[\min\left(\rho_{t'}^i \hat{A}_{t'}^i, \text{clip}(\rho_{t'}^i, 1-\epsilon, 1+\epsilon)\hat{A}_{t'}^i\right)\right]$$

$$\rho_{t'}^i = \frac{\pi_{\theta^a}(a_{t'}^i \mid o_{t'}^i)}{\pi_{\theta_o^a}(a_{t'}^i \mid o_{t'}^i)}$$

$$\hat{A}_{t'}^i = R_{t':t} + Y^{(T_t - T_{t'})}V_{\theta_{t'}^c}(o_t^i) - V_{\theta_{t'}^c}(o_{t'}^i)$$

$$R_{t:t+j} = \sum_{T_t < T_{t'}^c \leq T_{t+j}} \gamma^{(T_{t'}^c - T_t - 1)}r(s_{t'}, u_{t'})$$

wherein $L_A(\theta^a)$ denotes the strategy target function, $\theta^a$ denotes a network parameter of a strategy target neural network, t and t' denote numbers of object recommendation requests, $\mathbb{E}_{t'}$ denotes an expectation, $\rho_t^i$, denotes a probability ratio, $\hat{A}_t^i$, denotes an advantage function, clip ( ) denotes a clipping function, $\epsilon$ denotes a numerical value in an interval [0, 1], i and j denote natural numbers, $R_{t':t}$ and $R_{t:t+j}$ denote accumulated discounted rewards, respectively, $\gamma$ denotes a discount factor, $T_t$ and $T_{t'}$ denote initiation times of the object recommendation requests, $T_{t'}^c$ denotes a completion time of a t'-th object recommendation request, $r(s_{t'}, u_{t'})$ denotes a reward corresponding to the t'-th object recommendation request, $s_{t'}$ denotes a state of each of all the agent objects in a t'-th step, and $u_{t'}$ denotes a joint action of all agent objects in the t'-th step;

wherein the value target function of the multi-agent strategy model is determined based on the following equation:

$$L_C(\theta^c) = \mathbb{E}_{t'}\left[\left(R_{t':t} + \gamma^{(T_t - T_{t'})}V_{\theta_{t'}^c}(o_t^i) - V_{\theta^c}(o_{t'}^i)\right)^2\right]$$

wherein $L_C(\theta^c)$ denotes a mean square error (MSE) loss function of a value target neural network, $\theta^c$ is a model parameter of the value target neural network, and $V_{\theta_t^c}$ and $V_{\theta^c}$ denote the value target function;

wherein determining, according to the multi-agent strategy model and the object recommendation request, the object execution actions of the at least two agent objects matching the object recommendation request comprises: acquiring an agent observation determined by each of the at least two agent objects according to the object recommendation request; and acquiring an object execution action determined by each of the at least two agent objects according to the multi-agent strategy model and the agent observation;

wherein acquiring the object execution action determined by each of the at least two agent objects according to the multi-agent strategy model and the agent observation comprises:

acquiring, based on the following equation, the object execution action determined by each of the at least two agent objects according to the multi-agent strategy model and the agent observation:

$$a_t^i = \pi_{\theta^a}(o_t^i)$$

wherein at denotes the object execution action, $\pi_{\theta^a}$ denotes the multi-agent strategy model, $\theta^a$ denotes a model parameter of the multi-agent strategy model, and $o_t^i$ denotes the agent observation;

wherein determining the target object execution action according to the object execution actions comprises:

selecting, among the object execution actions, an object execution action that has a largest action value as the target object execution action.

2. The method of claim 1, wherein determining the object recommendation request comprises:

acquiring object recommendation requests;

in a case of determining that a plurality of object recommendation requests exist at a target receiving time point, determining a request processing order for the plurality of object recommendation requests;

sorting the plurality of object recommendation requests according to the request processing order; and determining, according to a request sorting result, a currently processed object recommendation request.

3. A model training method, comprising:

determining a value target function of a multi-agent strategy model and a strategy target function of the multi-agent strategy model; and training, according to the value target function and the strategy target function, the multi-agent strategy model;

wherein the multi-agent strategy model is configured to determine, in conjunction with an object recommendation request, object execution actions of at least two agent objects matching the object recommendation request to intelligently recommend a target agent object according to the object execution actions, the object recommendation request is a charging station recommendation request, and the at least two agent objects are charging stations;

wherein determining the strategy target function of the multi-agent strategy model comprises:

determining the strategy target function of the multi-agent strategy model based on the following equations:

$$L_A(\theta^a) = -\mathbb{E}_{t'}\left[\min\left(\rho_{t'}^i, \hat{A}_{t'}^i, \text{clip}(\rho_{t'}^i, 1-\epsilon, 1+\epsilon)\hat{A}_{t'}^i\right)\right]$$

$$\rho_{t'}^i = \frac{\pi_{\theta^a}(a_{t'}^i \mid o_{t'}^i)}{\pi_{\theta_o^a}(a_{t'}^i \mid o_{t'}^i)}$$

$$\hat{A}_{t'}^i = R_{t':t} + \gamma^{(T_t + T_{t'})}V_{\theta_{t'}^c}(o_t^i) - V_{\theta_{t'}^c}(o_{t'}^i)$$

$$R_{t:t+j} = \sum_{T_t < T_{t'}^c \leq T_{t+j}} \gamma^{(T_{t'}^c - T_t - 1)}r(S_{t'}, u_{t'})$$

wherein $L_A(\theta^a)$ denotes the strategy target function, $\theta$ denotes a network parameter of a strategy target neural network, t and t' denote numbers of object recommendation requests, $\mathbb{E}_{t'}$ denotes an expectation, $\rho_t^i$, denotes a probability ratio, $\hat{A}_t^i$, denotes an advantage function, clip ( ) denotes a clipping function, $\epsilon$ denotes a numerical value in an interval [0, 1], i and j denote natural numbers, $R_{t':t}$ and $R_{t:t+j}$ denote accumulated discounted rewards, respectively, $\gamma$ denotes a discount factor, $T_t$ and $T_{t'}$ denote initiation times of the object recommendation requests, $T_{t'}^c$ denotes a completion time of a t'-th object recommendation request, $r(s_{t'}, u_{t'})$ denotes a reward corresponding to the t'-th object recommendation request, $s_{t'}$ denotes a state of each of all the agent objects in a t'-th step, and $u_{t'}$ denotes a joint action of all agent objects in the t'-th step;

wherein determining the value target function of the multi-agent strategy model comprises:
determining the value target function of the multi-agent strategy model based on the following equation:

$$L_C(\theta^c) = \mathbb{E}_{t'}\left[\left(R_{t':t} + \gamma^{(T_t-T_{t'})}V_{\theta_{t'}^c}(o_t^i) - V_{\theta^c}(o_{t'}^i)\right)^2\right]$$

wherein $L_C(\theta^c)$ denotes a mean square error (MSE) loss function of a value target neural network, $\theta^c$ is a model parameter of the value target neural network, and $V_{\theta_t^c}$ and $V_{\theta^c}$ denote the value target function.

4. An electronic device, comprising:
at least one processor; and
a memory which is in a communication connection with the at least one processor; wherein
the memory is configured to store instructions executable by the at least one processor, and the instructions are executed by the at least one processor to enable the at least one processor to perform:
determining an object recommendation request, wherein the object recommendation request is a charging station recommendation request;
determining, according to a multi-agent strategy model and the object recommendation request, object execution actions of at least two agent objects matching the object recommendation request, wherein the at least two agent objects are charging stations;
determining a target object execution action according to the object execution actions; and
recommending the object recommendation request to a target agent object corresponding to the target object execution action;
wherein the multi-agent strategy model is trained according to a value target function of the multi-agent strategy model and a strategy target function of the multi-agent strategy model;
wherein the strategy target function of the multi-agent strategy model is determined based on the following equations:

$$L_A(\theta^a) = -\mathbb{E}_{t'}\left[\min\left(\rho_{t'}^i, \hat{A}_{t'}^i, \text{clip}(\rho_{t'}^i, 1-\epsilon, 1+\epsilon)\hat{A}_{t'}^i\right)\right]$$

$$\rho_{t'}^i = \frac{\pi_{\theta^a}(a_{t'}^i \mid o_{t'}^i)}{\pi_{\theta_{t'}^a}(a_{t'}^i \mid o_{t'}^i)}$$

$$\hat{A}_{t'}^i = R_{t':t} + \gamma^{(T_t+T_{t'})}V_{\theta_{t'}^c}(o_t^i) - V_{\theta_{t'}^c}(o_{t'}^i)$$

$$R_{t:t+j} = \sum_{T_t < T_{t'}^c \leq T_{t+j}} \gamma^{(T_{t'}^c - T_t - 1)}r(s_{t'}, u_{t'})$$

wherein $L_A(\theta^a)$ denotes the strategy target function, $\theta^a$ denotes a network parameter of a strategy target neural network, t and t' denote numbers of object recommendation requests, $\mathbb{E}_{t'}$ denotes an expectation, $\rho_t^i$ denotes a probability ratio, $\hat{A}_t^i$ denotes an advantage function, clip ( ) denotes a clipping function, $\epsilon$ denotes a numerical value in an interval [0, 1], i and j denote natural numbers, $R_{t':t}$ and $R_{t:t+j}$ denote accumulated discounted rewards, respectively, $\gamma$ denotes a discount factor, $T_t$ and $T_{t'}$ denote initiation times of the object recommendation requests, $T_{t'}^c$ denotes a completion time of a t'-th object recommendation request, $r(s_{t'}, u_{t'})$ denotes a reward corresponding to the t'-th object recommendation request, $s_{t'}$ denotes a state of each of all the agent objects in a t'-th step, and $u_{t'}$ denotes a joint action of all agent objects in the t'-th step;
wherein the value target function of the multi-agent strategy model is determined based on the following equation:

$$L_C(\theta^c) = \mathbb{E}_{t'}\left[\left(R_{t':t} + \gamma^{(T_t-T_{t'})}V_{\theta_{t'}^c}(o_t^i) - V_{\theta^c}(o_{t'}^i)\right)^2\right]$$

wherein $L_C(\theta^c)$ denotes a mean square error (MSE) loss function of a value target neural network, $\theta^c$ is a model parameter of the value target neural network, and $V_{\theta_t^c}$ and $V_{\theta_c}$ denote the value target function;
wherein determining, according to the multi-agent strategy model and the object recommendation request, the object execution actions of the at least two agent objects matching the object recommendation request comprises: acquiring an agent observation determined by each of the at least two agent objects according to the object recommendation request; and acquiring an object execution action determined by each of the at least two agent objects according to the multi-agent strategy model and the agent observation;
wherein acquiring the object execution action determined by each of the at least two agent objects according to the multi-agent strategy model and the agent observation comprises:
acquiring, based on the following equation, the object execution action determined by each of the at least two agent objects according to the multi-agent strategy model and the agent observation:

$$a_t^i = \sigma_{\theta^a}(o_t^i)$$

wherein $a_t^i$ denotes the object execution action, $\pi_{\theta^a}$ denotes the multi-agent strategy model, $\theta^a$ denotes a model parameter of the multi-agent strategy model, and of denotes the agent observation;
wherein determining the target object execution action according to the object execution actions comprises:
selecting, among the object execution actions, an object execution action that has a largest action value as the target object execution action.

5. The electronic device of claim 4, wherein determining the object recommendation request comprises:
acquiring object recommendation requests;
in a case of determining that a plurality of object recommendation requests exist at a target receiving time point, determining a request processing order for the plurality of object recommendation requests;
sorting the plurality of object recommendation requests according to the request processing order; and
determining, according to a request sorting result, a currently processed object recommendation request.

6. A non-transitory computer-readable storage medium, which is configured to store a computer instruction, wherein the computer instruction is used for enabling a computer to perform the intelligent recommendation method of claim 1.

7. A non-transitory computer-readable storage medium, which is configured to store a computer instruction, wherein the computer instruction is used for enabling a computer to perform the model training method of claim 3.

* * * * *